Patented Jan. 18, 1949

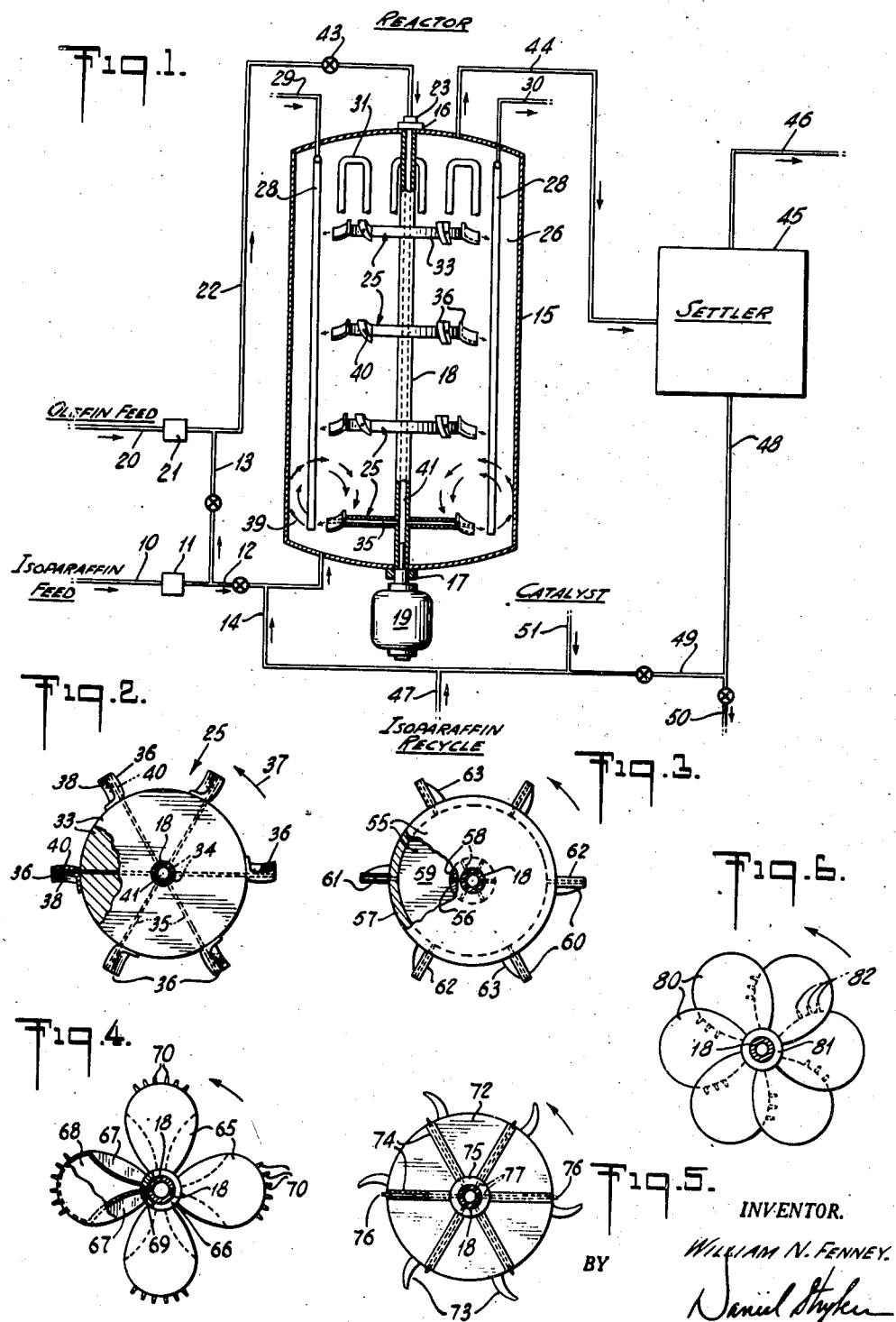

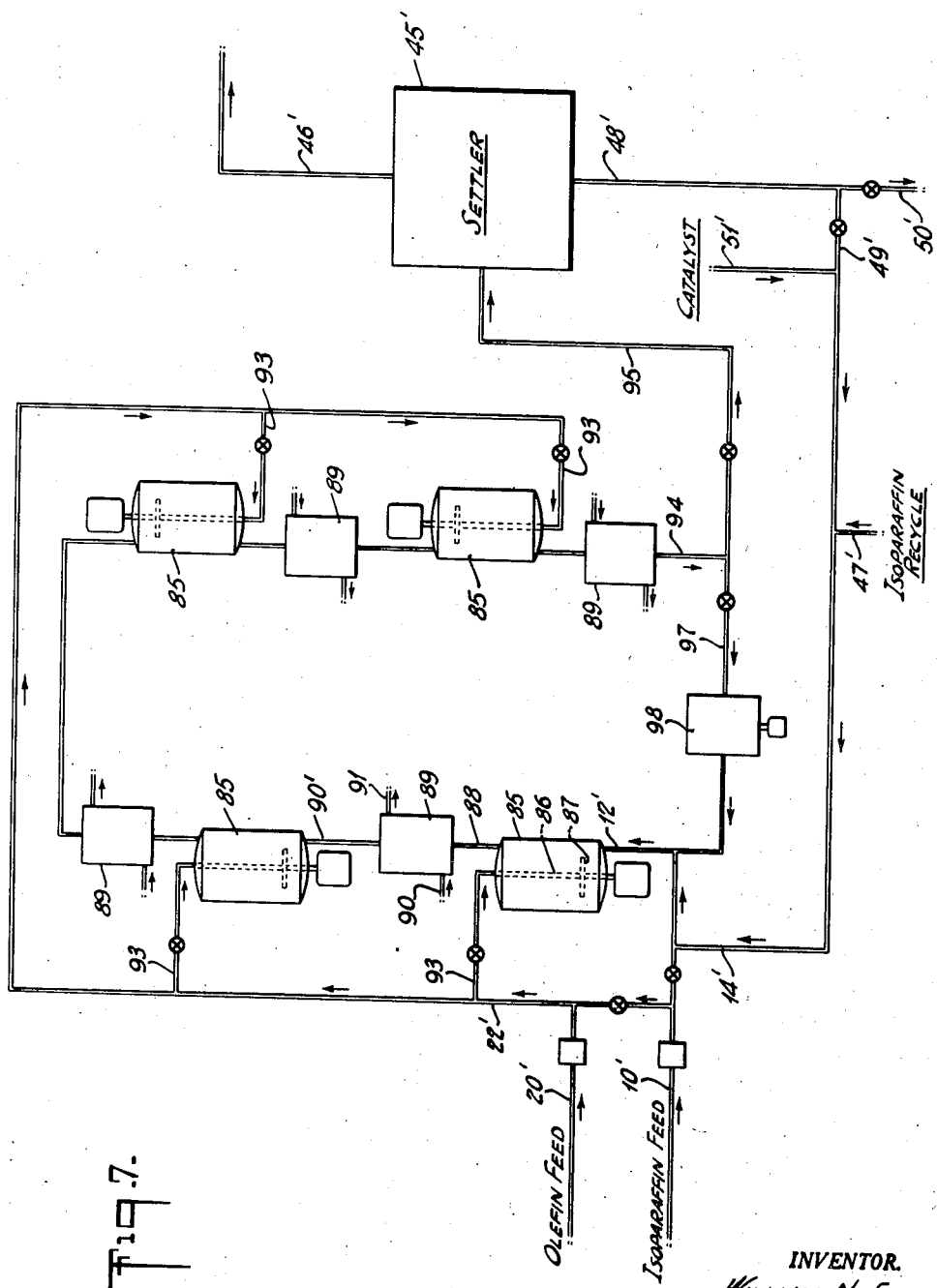

2,459,636

UNITED STATES PATENT OFFICE 2,459,636

ALKYLATION METHOD AND APPARATUS

William N. Fenney, New York, N. Y., assignor to The Texas Company, New York, N. Y., a corporation of Delaware Application April 25, 1945, Serial No. 590,214

9 Claims. (Cl. 260—683.4)

1

This invention relates to the catalytic alkylation of a hydrocarbon or other organic compound having a replaceable hydrogen atom with a suitable alkylating agent, such as an olefin, for the production of gasoline hydrocarbons of high antiknock value suitable for aviation gasoline and motor fuel, or for the production of valuable alkylated organic compounds for other purposes.

One of the principal objects of the invention is to provide an improved method of carrying out the alkylation operation to increase the selectivity of the desired alkylation reaction and minimize undesired side reactions, to thereby produce high yields of a superior quality of alkylate and increase catalyst life.

A further object of the invention is to effect multi-point dispersion of the olefin or other alkylating agent in the reaction mixture in a simple and economical manner to prevent local accumulation of the alkylating agent in and local overheating of any increment of the reaction mix.

Another object of the invention is to provide more effective reaction conditions by combining highly efficient agitation of the reaction mix with rotary multi-point dispersion of the alkylating agent in the agitated mix, and also prompt refrigeration of the mix containing dispersed alkylating agent immediately after introduction of the latter to remove the heat of reaction as fast as it is liberated.

Still another object of the invention is to provide improved alkylation apparatus for carrying out the above method and accomplishing the foregoing objects, wherein the apparatus is simple and economical in construction, readily controlled and highly efficient in operation, and is provided with a rotary agitator and dispersion member for dispersing the alkylating agent in the reaction mix.

Other objects and advantages of the invention will be apparent from the following description when taken in conjunction with the accompanying drawing and appended claims.

Various catalytic alkylation processes for alkylating an isoparaffin with an olefin or other suitable alkylating agent for the production of gasoline hydrocarbons of high antiknock value are known. These involve the use of catalysts such as strong sulfuric acid, hydrofluoric acid, a fortified aluminum halide-hydrocarbon complex, BF$_3$-water complex and the like. The best known process which is now widely used on a commercial scale is the sulfuric acid alkylation process. Various reactors, such as the pump and time tank reactor, jet type reactor, and propeller type of

2 mixer such as the Stratco reactor, have been used in this process. In these various processes, it is an objective to preferentially react the olefin with the isoparaffin to produce the desired alkylate and minimize side reactions of the olefin with itself and with the catalyst, which side reactions cause deterioration in quality and yield of the product and reduce catalyst life.

In order to accomplish this objective, it is customary to use a feed in which the isoparaffin is in substantial molar excess of the olefin, and also to recycle hydrocarbon products or an emulsion of catalyst with hydrocarbon products in order to build up a very high ratio of isoparaffin to olefin at the point of contact of the olefin with the alkylation catalyst. Efficient agitation of the reaction mix is also employed. In the various types of reactors customarily used, the olefin is introduced from a relatively large pipe opening at one point or localized area, or at two or three points at the most, of any reactor system; and reliance has been placed on efficient agitation or rapid circulation of the hydrocarbon-catalyst mix past the zone of olefin introduction. While good operation has been secured, particularly where a very high isoparaffin or isobutane concentration of about 60–70% or more by volume has been maintained in the hydrocarbon phase of the reaction mix, there are still some side reactions which show up largely in reduction in yield and quality of the alkylate and in catalyst deterioration, thereby increasing the cost of the process per unit volume of alkylate and finished 100 octane gasoline produced. Further, the necessity for maintaining the very high isobutane concentration in the reaction mix represents one of the most expensive items of the process, since extensive fractionating equipment of high installation and operating cost is required for separating isobutane of the necessary purity for recycling to the reaction zone. Consequently, improved methods for increasing the selectivity of the alkylation reaction and minimizing undesired side reactions, while at the same time enabling lower isoparaffin concentrations to be employed in the hydrocarbon phase of the reaction mix and still obtain ceiling or high quality alkylate, had remained a desideratum.

It has heretofore been proposed to introduce the olefin or other alkylating agent into the reaction mix by so-called "multi-point" injection, wherein the olefin is added from a large number of small openings or jets which are widely spaced from each other throughout a substantial portion of the reaction zone, in order to avoid local accumulation. While this is effective for the purpose intended, rather complicated and expensive constructions of distributors and piping are required. It has also been proposed to combine this multipoint olefin injection with immediate refrigeration of the reaction mix in a heat exchange type of reactor having multiple concentric pipes.

In accordance with the present invention, the olefin or other alkylating agent is dispersed in very finely divided form throughout an extensive zone, so as to avoid local accumulation, by centrifugal force, with or without added pressure, from a small opening or openings in a rotary dispersion member, wherein the jet opening is sufficiently removed from the axis of rotation to provide high linear velocity of the said opening in a circular path of substantial diameter through the reaction mix. At the same time the dispersion member also functions as an efficient agitator to produce high speed agitation and local recirculation of reaction mix past the zone of dispersion. The zone of dispersion is closely surrounded by refrigeration means, so that the mix containing the highly dispersed olefin, immediately after the latter has been introduced, is subjected to heat exchange or chilling to remove the heat of reaction as fast as it is liberated. Moreover, this is accomplished by an improved alkylation reactor of simple and inexpensive construction, and which is readily controlled in operation.

In the drawing, which illustrates preferred embodiments of the present invention:

Fig. 1 is a diagrammatic view with the reactor in vertical section, of a single stage alkylation system embodying the features of the present invention.

Fig. 2 is a plan view of the combined agitator and dispersion member employed in the reactor of Fig. 1;

Figs. 3 to 6 inclusive are plan views, similar to Fig. 2, illustrating various modifications of the combined agitator and dispersion member; and Fig. 7 is a diagrammatic view of a multi-stage alkylation system involving separate reactors and refrigeration heat exchangers, and representing a further modification of the present invention.

Referring to Fig. 1, the isoparaffin feed from line 10 is forced by pump 11 through either or both of valve controlled lines 12 and 13. Valve controlled line 12 is joined by line 14 through which a mixture of isoparaffin recycle and catalyst, obtained as hereinafter described, is introduced into the system. As shown, line 12 enters the lower end of a vertical tank 15 constituting the alkylation reactor.

Mounted in suitable bearings 16 and 17 carried at opposite ends of tank 15 is an axially positioned hollow shaft 18, the lower end of which is directly connected to variable speed driving motor 19. Olefin feed from line 20 is forced by pump 21, together with any isoparaffin from line 13, through line 22. The latter communicates by conventional floating connection 23 with the upper end of shaft 18, whereby the olefin or mixed isoparaffin and olefin feed is introduced into the space within the hollow shaft. Preferably, the bulk of the isoparaffin fresh feed and recycle is introduced along with the alkylation catalyst through line 12; although a sufficient amount of isoparaffin may be added by line 13 to form a premixed feed in line 22 wherein the isoparaffin is at least about equal in molar ratio to the olefin content.

Mounted at spaced intervals along the length of shaft 18 are a plurality of agitating and dispersion members indicated generally by the numeral 25. While Fig. 1 shows four such members within the reaction zone 26 confined by tank 15, it is to be understood that this is merely for purposes of illustration and that any number from one to ten or more may be provided depending on the length of the tank and the construction of the agitator. Also mounted within tank 15 is a refrigeration coil comprising a plurality of vertically arranged pipes 28 closely surrounding the periphery of the agitating and dispersion members 25 and spaced from the wall of the tank. While any suitable construction of heat exchange coil can be employed, the one illustrated is designed for serial flow from refrigeration inlet 29 to outlet 30, alternate pairs of vertical pipes 28 being equipped with return bends indicated at 31 at top and bottom for serial flow. Preferably, two semi-cylindrical coils are provided to form the complete enclosing cylinder of refrigeration coils about the dispersion members 25, each coil being equipped with its separate refrigeration inlet and outlet 29 and 30 respectively to give more efficient and uniform refrigeration.

Each of the agitating and distributing members 25 may be constructed as shown in Fig. 2. A solid metal disc 33 is pinned or otherwise secured to shaft 18 in fixed location so that a plurality of small drill holes 34 extending through the annular metal wall of shaft 18 communicate with radial bores 35 drilled completely through disc 33 from the outer periphery to the central opening which snugly fits about shaft 18. Welded or otherwise secured to the periphery of disc 33 are a plurality of curved agitating blades 36, shown as six in number. The direction of rotation is indicated by the arrow 37. Each blade has a leading face 38 which is curved in the form of a scoop and is also tapered off on the upper side, so that rotation imparts both an outward and upward thrust to the liquid contents within reaction zone 26, thereby producing a local recirculation indicated by the arrows 39 in Fig. 1. The trailing wall of each blade 36 is drilled completely through from the tip to the inner surface which rests on the periphery of the disc, thereby forming a bore 40 which constitutes a continuation of the cooperating radial bore 35 in the disc. The interconnected bores through the shaft, disc and blade thus form a continuous unidirectional radial passage from the hollow space 41 within shaft 18 to the very tip of the blade 36.

If desired, the outer end of bore 40 can be threaded to receive a small nozzle or jet, which preferably has its outer tip substantially flush with the tip of the blade. However, this is not essential, since the bore 40 can be drilled of desired size to function as the jet. While each blade 36 is shown as equipped with a dispersing jet, it will be understood that only one blade may be so provided, or alternate blades equipped with jets, etc. whereby from one to six jets are afforded for the particular agitator and dispersing member shown. The construction shown, in which there is a jet for each blade, with the jet located at the tip of the blade, constitutes a preferred arrangement.

The size of each jet depends upon the diameter and speed of rotation of the agitator and consequently upon the centrifugal force produced during its operation. However, the jet should be less than one-fourth inch in diameter in any event, and preferably is about one-sixteenth to one-eighth of an inch, with the communicating bores of somewhat larger size to avoid plugging and facilitate cleaning. The distance of the jet from the axis of rotation, and the speed of rotation, are selected to give a linear velocity of the jet through the reaction mix of about 5-60 feet per second and preferably about 10-20 feet per second. Ordinarily, the agitator will have a minimum diameter of about six inches for a small diameter tank 15 of about twelve inches; and this may vary up to an agitator diameter of about eight feet for a twelve foot diameter tank. With the smaller diameter agitators, a variable speed motor 19 may be directly connected to shaft 18 to drive that shaft over a speed range of about 1800–3600 R. P. M. On the other hand, with the larger diameter agitators, the motor may be connected to a speed reducing gearing to drive the agitator at about 50 R. P. M. for the largest size specified above, up to about 1800 R. P. M. for the intermediate size, to produce linear velocities of the jets within the range specified.

In the customary alkylation operation of a low-boiling isoparaffin, such as isobutane, with a normally gaseous olefin, such as a butylene, the tank is maintained under a pressure of about 50–75 pounds per square inch to maintain the hydrocarbons in liquid phase. Generally, the centrifugal force produced at the jet will considerably over-balance the maintained pressure within the tank. A regulating valve 43 is therefore provided in feed line 22 to permit desired control of the rate of feed of the olefin to the dispersion jets or orifices.

A discharge line 44 leads from the upper portion of the tank to a settler 45. A progressive movement of the reaction mix takes place through the reaction zone 26 from the inlet to the outlet, depending on the rate of feed. The high linear velocity of the jets carried by the rotary agitators produces a very fine dispersion of the olefin feed into the reaction mix from the blade tips. At the same time, the blades 36 produce a violent agitation in the form of a local recirculation of reaction mix outwardly and upwardly against the wall of tank 15, from where it is diverted inwardly toward the center as shown. A similar local recirculation is created for each dispersion zone; and the opposing forces and currents in the region between two adjacent zones further contribute to the agitating effect. From the center, the reaction mix is again drawn outwardly to the periphery of the agitator, where it is picked up by the rotating blades and the cycle repeated.

In those cases where the centrifugal force may not be sufficient to overcome the high pressure within the tank plus the pressure drop in the dispersion system, then the olefin feed pump 21 is designed to supply the feed in liquid phase under an excess pressure, and valve 43 used to regulate the rate of olefin feed in a similar manner. In any event, it is desired to have at least two pounds per square inch pressure drop across the orifices and preferably about 5–15 pounds per square inch or more. In this manner, the olefin is jetted into the reaction mix with substantial force, providing the high dispersion described above. The mix containing dispersed olefin immediately contacts the refrigeration coil 28 just after the olefin has been added, so that refrigeration is present at substantially the instant of initial reaction. By spacing the refrigeration coil from the wall, it will be noted that the local recirculation provides double contact of the mix with the coil, once as it is proceeding outwardly toward the wall of the tank, and again as it is diverted inwardly toward the center. Moreover, the relatively rapid local recirculation increases the contact of the mix with the coil, further improving the cooling effect.

The reaction products discharged by line 44 are allowed to stratify in settler 45 into an upper hydrocarbon layer and a lower catalyst layer. The former is withdrawn by line 46 to conventional neutralizing and washing zones, and the neutralized hydrocarbon is then passed to conventional stabilizing and fractionating equipment, where the desired aviation or motor fuel alkylate, consisting essentially of branched chain paraffin hydrocarbons of high antiknock value, is recovered. Also, the excess isoparaffin or isobutane is recovered as an isobutane-rich fraction for recycling in the system. The isoparaffin recycle line is indicated at 47. A stream of the settled acid is withdrawn by line 48, and the major proportion recycled by line 49 which joins line 14. A minor proportion of the catalyst may be discharged to recovery by line 50, and makeup catalyst introduced by line 51. Preferably, the recycle isoparaffin 47 is first mixed and emulsified with the recycle and fresh feed catalyst as shown, and this mixture or emulsion then introduced together with the fresh isoparaffin feed from line 10 into the reaction zone.

The present invention is applicable to the alkylation of any low-boiling isoparaffin with any normally gaseous or normally liquid olefin. Thus, the isoparaffin may be isobutane, isopentane or isohexane. The olefin may be ethylene, propylene, butylenes, pentylenes, hexylenes, other higher boiling monomeric olefins or certain selected fractions of cracked naphthas, olefin polymers, such as diisobutylene, triisobutylene, cross polymers of isobutylene and normal butylenes, and various mixed or non-selective polymers. In place of olefins as the alkylating agent, various alkyl esters, such as the sulfates, chlorides, fluorides, etc. of the corresponding olefins may be used. Moreover, various aliphatic alcohols and ethers, such as tertiary butyl alcohol, isopropyl alcohol, butyl ether, etc., may be employed as the alkylating agent, particularly with catalysts which have tolerance for water liberated in the reaction, such as $BF_3$-water complex. The expression "alkylating agent" is used herein throughout the description and claims to denote any of the above compounds which react with an isoparaffin or other organic compound having a replaceable hydrogen atom in this alkylation reaction to produce alkylated compounds. In place of the pure hydrocarbons or other alkylating agents, it is of course to be understood that various refinery fractions, such as $C_4$, $C_3$—$C_4$, $C_4$—$C_5$, $C_3$—$C_5$, $C_5$, etc. may be employed.

The present invention is applicable to the use of any of the well-known alkylation catalysts, such as sulfuric acid, hydrofluoric acid, aluminum chloride-hydrocarbon complex, $BF_3.H_2O$, chlorosulfonic acid, fluorosulfonic acid, and the like. The various conditions for the reactions employing these catalysts are well-known; and conventional conditions coupled with the features of the present invention as set forth above may be used. By way of example, the invention is more particularly described herein in connection with the use of strong sulfuric acid as the catalyst; but it is to be understood that this is by way of illustration and not limitation.

The conventional conditions for this sulfuric acid alkylation include an isoparaffin-olefin feed ratio of about 3:1 to 8:1 or higher, an acid strength in the reaction zone of about 89–96% with makeup acid of about 98–100% strength, a temperature of about 20–80° F. and preferably about 35–60° F., sufficient pressure to maintain the hydrocarbon reactants in the liquid phase, an acid to hydrocarbon volume ratio in the reaction zone of about 0.5:1 to about 2:1 and preferably about 0.8:1 to 1.2:1, and a contact time of about 15–60 minutes. A high isoparaffin concentration of around 60–70% by volume in the hydrocarbon phase in the reacted mix can be employed, although the present invention enables much lower isoparaffin concentrations of about 40–50% to be used with greatly improved economies and increased capacity, while still maintaining good quality of product. Also, while the longer conventional times of contact may be used together with conventional emulsion or hydrocarbon recycle, it will be noted from Fig. 1 that emulsion or hydrocarbon recycle need not be employed and in fact is desirably omitted, and once-through flow used. The contact time may be reduced to as low as 1–5 minutes with further increase in capacity. This enables smaller size reactors to be used for an equivalent output, with resulting decrease in installation expense and lowering of power requirements for the reactor.

While the invention has been described above as particularly applied to the alkylation of an isoparaffin with an alkylating agent, it is to be understood that the invention is applicable to the alkylation of any organic compound having a readily replaceable hydrogen atom with a suitable alkylating agent. For example, the method and apparatus described herein can be employed for the alkylation of a normal paraffin with an olefin or other alkylating agent, employing a catalyst effective for this normal paraffin alkylation, such as HF—BF$_3$, aluminum chloride with hydrogen chloride, and the like. Likewise, the invention is applicable to the alkylation of aromatics and hydroxy-aromatics, such as benzene, toluene, xylene, phenol, cresol, etc., with an alkylating agent such as an olefin, an alcohol, an alkyl halide, etc. By way of specific examples, there is mentioned the alkylation of benzene with ethylene to produce ethyl benzene, an intermediate in the manufacture of styrene; the alkylation of chlorinated kerosine with benzene to produce so-called "keryl benzene" for the detergents and wetting agents; and the preparation of alkylated phenols as special solvents or chemicals. The conditions for these various reactions are known, and conventional conditions can be utilized in conjunction with the principles of the present invention. The expression "organic compound having a readily replaceable hydrogen atom" is used for convenience throughout the description and claims to designate the various materials described above which can be alkylated with the mentioned alkylating agents in the presence of suitable alkylation catalysts as described.

Referring to Fig. 3, a modified form of agitator and dispersion member is illustrated. This comprises two flat sheet metal discs indicated at 55, which are attached by welding or in other suitable manner on opposite sides of inner and outer concentric metal rings indicated at 56 and 57 respectively. The disc assembly is in turn pinned to shaft 18 so that one or more drill holes through the annular shaft are in alignment with drill holes 58 through the inner ring 56, whereby the olefin feed is supplied to an inner annular chamber 59 formed between the discs 55. Attached to the periphery of the disc assembly are a plurality of blades 60. One or more, and preferably all, of the blades are drilled to provide passages 61 in alignment with cooperating drill holes through the outer concentric ring 57, whereby the olefin is fed by centrifugal force through the passageways 61 and out of the blade tips. As shown, each blade has a leading edge 62 which extends substantially radially and is comparatively flat and generally parallel to a vertical plane through the axis of rotation, while the rear or trailing edge 63 is curved. Moreover, the blades are elongated somewhat with respect to the diameter of the discs 55, in comparison to the construction shown in Fig. 2. This form provides more of a churning effect, and gives local recirculation both above and below the agitator.

Fig. 4 discloses a further modification wherein the agitator and dispersing member is of the propeller type, having a plurality of elongated fan blades 65 attached to a central collar 66, the latter being fastened to the hollow shaft. Each fan blade 65 is formed of two opposing sheet metal plates which are stamped or otherwise pressed into the usual curved shape, and which are welded together at their inner surfaces indicated at 67 and also about the remaining periphery, thereby forming an interior hollow chamber 68 which communicates with aligned bores 69 drilled through the collar 66 and shaft. The outer tip of each blade is drilled or otherwise provided with a plurality of jets indicated at 70 and shown to be six in number.

Depending on the pitch and mounting of the blades, either a central downward or upward circulation of the reaction mix is imparted by the rotation of the propeller. With this agitator, tank 15 is preferably provided with interior baffles in the form of plates which are located intermediate the various agitators, said plates being formed with openings at the periphery thereof which provide communicating passages along the wall of tank 15 for progressive movement of the reaction mixture from the inlet to the outlet. These baffles thus provide contact surfaces for the local recirculation. For example, assuming the propeller is set to cause an upward circulation, the mixture will contact the superposed baffle and be deflected outwardly and downwardly to the wall of tank 15, and thence be returned to the center for recirculation by the propeller. In this form, the baffles can be provided with openings receiving the pipes 28 of the heat exchange coil, or the periphery of the baffles can terminate just within the coil, and be fastened in place by suitable lugs extending inwardly from the wall of tank 15. The rapid rotation of the propeller disperses the alkylating agent by centrifugal force through the jets 70 outwardly toward the refrigerating zone of coil 28; and the reaction mixture containing dispersed alkylating agent is then drawn toward the center and forced by the propeller in the recirculating path previously described, whence it is again brought into contact with the refrigerating coil.

A further modification of the bladed impeller of the disc type is shown in Fig. 5. This comprises a single metal disc 72 having affixed to its periphery a plurality of curved blades 73. Mounted immediately above the discs 72 and preferably attached thereto in the form of strengthening ribs are a plurality of radially extending hollow spokes 74 extending outwardly from a central collar 75 and terminating approximately at the periphery of disc 72. One or more, and preferably all, of the hollow spokes are equipped with jets indicated at 76 at substantially the periphery of the disc and immediately in advance of a cooperating blade 73 in the direction of rotation of the impeller. Each blade has a curved portion of increased width extending outwardly to overlap and impact the dispersed alkylating agent immediately after it is discharged from the cooperating jet 76. Dispersion is thus effected by the combined jetting action of the rotary dispersion member and by impact of the blades on the reaction mix containing the dispersed alkylating agent immediately after the latter has been injected. The inner ends of the hollow spokes communicate with aligned drilled bores 77 in the collar 75 and shaft.

It will be understood that, in all of these various modifications, the refrigerating coil 28 closely surrounds the zone of dispersion. Thus, in Fig. 5, the alkylating agent is first jetted into the reaction mix, is then immediately impacted by the blades to further promote dispersion, and is then circulated into immediate contact with the refrigerating coil.

Fig. 6 discloses a further modification of the propeller type of agitator, similar to Fig. 4, except that in this case the blades 80 are of the circular or wider oval type and overlap each other. Here again, each blade is formed of two opposed plates which are fastened together to form an interior hollow chamber receiving alkylating agent through communicating bores in the supporting collar 81 and the hollow shaft. In this form, each blade is provided with a plurality of jets 82, shown as three in number, formed on the leading edge rearwardly from the tip; and the trailing side of each blade is curved upwardly so as to provide immediate impact of the mixture containing dispersed alkylating agent by the blade in its rotation. It will be understood that, with the propeller of Fig. 6, baffles can be mounted in tank 15 to provide for the local recirculation in the manner described for Fig. 4.

While the alkylation apparatus comprising rotary agitating and dispersion members closely surrounded by a refrigerating coil constitutes a preferred form of the invention, whereby substantially immediate refrigeration in the zone or zones of dispersion is secured, this can be modified while still retaining features and advantages of the present invention.

Fig. 7 illustrates such a modification involving a multi-stage system, including alternately connected reactors and refrigerated heat exchangers. As shown, each reactor comprises a tank 85 of comparatively small volume and equipped with a central hollow shaft 86 carrying a rotary agitator and dispersion member 87, preferably of the multi-bladed disc type of Fig. 2, 3 or 5. The mixed isoparaffin or other organic compound and alkylation catalyst are introduced by line 12' into the lower portion of tank 85, and reaction products discharge from the upper portion thereof by line 88 in accordance with the feed rate. These products then flow through heat exchanger 89 supplied with refrigerant by line 90 and discharged by line 91. While there is local recirculation within tank 85 as produced by the agitator 87, due to the relatively small volume of tank 85 in comparison to the fresh feed rate, the time of contact within tank 85 is of the order of several minutes or less. Consequently, the mixture is promptly introduced by line 88 into the heat exchanger 89, where the heat of reaction is removed and the temperature controlled. The products then flow by line 90' into the next reaction tank 85 and so throughout the system in series flow.

Olefin or other alkylating agent is introduced by line 22', and is then split between the various reactors by the valve controlled branch lines 93. Each of the branch lines 93 communicates by a floating connection with the hollow shaft 86 of the reactor, whereby the alkylating agent is fed through the hollow shaft and thence through communicating passages in the agitator 87 to be discharged from the rotating jets in the manner previously described. It will be understood that the rate of feed of alkylating agent can be varied throughout the various stages of the plural stage unit, and preferably is reduced in the direction of flow in accordance with the isoparaffin concentration of the hydrocarbon phase of the reacted mix.

Reaction products from the final stage heat exchanger pass by line 94 to valve controlled line 95, and thence to settler 45', from where the hydrocarbon and catalyst streams are removed by lines 46' and 48' in the manner previously described. It will be understood that primed reference numerals are employed in Fig. 7 to designate similar elements as described above for Fig. 1.

While once-through flow, with the reaction products from the last stage passing directly by line 95 to settler 45', constitutes the preferred operation, the present invention can be employed with emulsion recycle if desired. As shown, a valve controlled branch line 97 containing an emulsion recirculating pump 98 communicates with line 94 and discharges into feed line 12'. Consequently, by suitable regulation of the valves in 95 and 97 respectively, any desired portion of the reaction mix from line 94 can be recycled in the system, the balance being discharged to recovery.

It will be understood that reactors of the type disclosed in Figs. 1–5 can also be connected in series for multi-stage operation. Also, reactor 85 of Fig. 7 can be equipped with an interior refrigeration coil in place of the exterior heat exchanger shown. Further, any combination of agitators of the types shown in Figs. 2–6 can be used in one reactor, for example, a combination of impeller and propeller agitators.

The following is listed as a specific example of the present invention. A twelve inch diameter cylindrical tank equipped with an eight inch diameter multi-bladed impeller of the type disclosed in Fig. 2, with the latter surrounded by a one inch external diameter heat exchange coil spaced one-half inch from the tank wall and also one-half inch from the blade tips, is utilized for isobutane-butylene alkylation with strong sulfuric acid. A 1:1 by volume mixture of isobutane and sulfuric acid of about 93% system acidity is continuously fed into the tank, while the butylene feed is jetted into the mixture through jets having a diameter of one-sixteenth inch and carried by the impeller rotating at 1800 R. P. M. The temperature is maintained at about 35° F., and the reaction mix discharging from the reactor has a volume ratio of acid to total hydrocarbons of about 0.8:1, and an isobutane concentration in the hydrocarbon phase of the reaction mix of about 50%. Under these conditions, a rate of feed of olefin equivalent to about 0.5 volume per volume of catalyst per hour produces an alkylate of substantially ceiling quality from a total $C_4$ refinery gas fraction containing substantial amounts of both isobutylene and normal butylenes. A yield of total liquid alkylate of approximately 194% by weight on the basis of the olefin charged is secured, of which about 96% boils within the aviation fraction below 311° F., the aviation fraction having a clear CFRM octane of 95.

Obviously many modifications and variations of the invention, as hereinbefore set forth, may be made without departing from the spirit and scope thereof, but only such limitations should be imposed as are indicated in the appended claims.

I claim:

1. Continuous alkylation apparatus of the character described, comprising a tank adapted to confine a reaction zone, a supply line at one end of said tank adapted for introducing liquid organic compound and liquid alkylation catalyst into said reaction zone, a discharge line at the opposite end of said tank adapted for the discharge of reaction products, a central hollow rotary shaft mounted within said tank, an agitator having an impact blade carried by said shaft within said tank, a dispersing jet carried by said agitator and having a small opening positioned at a substantial distance from the axis of rotation of said shaft and immediately in advance of an impact portion of said blade in the direction of rotation of said agitator, said shaft and agitator having communicating passages between the space within said hollow shaft and said jet opening, a supply line for liquid alkylating agent, a floating connection between said supply line and one end of said hollow shaft, power means connected to the other end of said shaft for rotating the same, whereby liquid alkylating agent is supplied to said hollow shaft and thence to said jet and is discharged from the latter in a manner to be immediately impacted by said blade, and a refrigeration coil mounted within said tank and closely surrounding said agitator so as to be positioned between the circular path of said jet and the wall of said tank, said refrigeration coil being spaced from the tank wall.

2. In the alkylation of an organic compound having a replaceable hydrogen atom with an organic alkylating agent in the presence of a liquid alkylation catalyst, the improvement which comprises introducing the liquid alkylation catalyst and organic compound adjacent one end of a long closed reaction zone, progressively flowing the reaction mix at a relatively slow rate through said reaction zone from said one end to the opposite end thereof and discharging reaction products from adjacent said opposite end, dispersing the alkylating agent by multipoint addition from a large number of orifices spaced along the greater part of the length of said reaction zone while moving said orifices at high peripheral speed in circular paths of substantial diameter extending generally across the direction of progressive flow of reaction mix along the length of said reaction zone, subjecting the alkylating agent to mechanical impact immediately after dispersion from said orifices and throughout the entire range of rotative movement of said orifices and simultaneously agitating the reaction mix by internally recirculating a plural number of different localized portions of the reaction mix at a relatively high rate while maintaining the relatively slower progressive flow of reaction mix along the length of said reaction zone.

3. The method according to claim 2, wherein the reaction mix containing dispersed alkylating agent is subjected to indirect refrigerative chilling closely surrounding the zones of dispersion and mechanical impact, whereby the heat of reaction is immediately removed to prevent local overheating of any increment of the mixture.

4. In the alkylation of an organic compound having a replaceable hydrogen atom with an alkylating agent in the presence of a liquid alkylation catalyst, the improvement which comprises dispersing the alkylating agent in liquid phase in a small jet into a reaction mix of organic compound and alkylation catalyst in a reaction zone while moving the jet through the reaction zone in a cylindrical path of substantial diameter and at high linear velocity, subjecting the jet throughout its entire path of movement to violent impact immediately after it is discharged into the reaction zone, and immediately subjecting the reaction mix containing dispersed alkylating agent to indirect refrigerative chilling in a zone closely surrounding the zone of alkylating agent dispersion and impact to remove the heat of reaction and prevent local overheating of any increment of the reaction mix.

5. In an alkylation reactor of the character described, having a tank providing a reaction space, a hollow rotary shaft mounted therein, and means for supplying alkylating agent in liquid phase to said hollow shaft; a rotary agitator and alkylating agent dispersion member carried by said shaft comprising a disc carrying a plurality of agitating blades about the periphery thereof, a jet mounted adjacent the periphery of said disc immediately in advance of one of said blades in the direction of rotation thereof, and said parts having a passage providing communication between said hollow shaft and said jet, whereby a liquid stream of alkylating agent is discharged from said jet during rotation of said member and the said liquid stream is immediately impacted by said one blade.

6. In an alkylation reactor of the character described, having a tank providing a reaction space, a hollow rotary shaft mounted therein, and means for supplying alkylating agent in liquid phase to said hollow shaft; a rotary agitator and alkylating agent dispersion member carried by said shaft comprising a plurality of propeller blades of substantial curvature carried by said shaft, a jet mounted at the leading edge of one of said blades and directed to discharge across the path of movement of a curved trailing side of said blade, said parts having a passage providing communication between said hollow shaft and said jet, whereby said jet discharges on rotation of said member a liquid stream of alkylating agent which is immediately impacted by the curved trailing side of said blade.

7. In an alkylation reactor of the character described, having a tank providing a reaction space, a hollow rotary shaft mounted therein, and means for supplying alkylating agent in liquid phase to said hollow shaft; a rotary agitator and alkylating agent dispersion member carried by said shaft, a jet carried by said member at a substantial distance from the axis of rotation thereof, said parts having a passage providing communication between said hollow shaft and said jet, and an impact surface carried by said member in a position to immediately impact the liquid stream of alkylating agent as it is discharged from said jet on rotation of said member.

8. Continuous alkylation apparatus of the character described, comprising a tank adapted to confine a reaction zone, a supply line at one end of said tank adapted for introducing liquid organic compound and liquid alkylation catalyst into said reaction zone, a discharge line at the opposite end of said tank for the discharge of reaction products, a central hollow rotary shaft mounted within said tank, an agitator carried by said shaft within said tank comprising a disc carrying a plurality of agitating blades about the periphery thereof, together with a plurality of jets positioned at a substantial distance from the axis of rotation of said shaft, said shaft and agitator having communicating passages between the space within said hollow shaft and said jets, each said jet being mounted adjacent the periphery of said disc immediately in advance of a cooperating blade in the direction of rotation of said agitator whereby each cooperating blade is adapted to impact liquid as it is discharged from said jet, means for supplying liquid alkylating agent to said hollow shaft, and a refrigeration coil mounted within said tank and closely surrounding said agitator so as to be positioned between the circular path of each said jet and the wall of said tank, said refrigeration coil being spaced from the tank wall.

9. In an alkylation reactor of the character described, having a tank providing a reaction space, a hollow rotary shaft mounted therein, and means for supplying alkylating agent in liquid phase to said hollow shaft; a rotary agitator and alkylating agent dispersion member carried by said shaft comprising a disc carrying a plurality of agitating blades spaced about the periphery thereof, a plurality of hollow radial spokes extending outwardly from said central hollow shaft to the periphery of said disc on one side of the latter, together with a plurality of jets carried at the outer ends of said hollow spokes adjacent the periphery of said disc and immediately in advance of said blades in the direction of rotation of said agitator and adapted to provide impact of jetted liquid by said blades immediately after discharge from the said jets.

WILLIAM N. FENNEY.

REFERENCES CITED

The following references are of record in the file of this patent:

UNITED STATES PATENTS

| Number | Name | Date |
|---|---|---|
| 2,238,802 | Altshular et al. | Apr. 15, 1941 |
| 2,246,703 | Thiele et al. | June 24, 1941 |
| 2,357,607 | Ocon et al. | Sept. 5, 1944 |
| 2,379,368 | Matuszak | June 26, 1945 |
| 2,419,097 | Stratford et al. | Apr. 15, 1947 |